(12) United States Patent
Shah et al.

(10) Patent No.: US 12,490,147 B2
(45) Date of Patent: Dec. 2, 2025

(54) METHODS AND SYSTEMS FOR AF CONTROL OF NETWORK SLICE QUOTA

(71) Applicant: SAMSUNG ELECTRONICS CO., LTD., Suwon-si (KR)

(72) Inventors: Sapan Pramodkumar Shah, Bangalore (IN); Lalith Kumar, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 17/818,620

(22) Filed: Aug. 9, 2022

(65) Prior Publication Data

US 2023/0051733 A1 Feb. 16, 2023

(30) Foreign Application Priority Data

Aug. 9, 2021 (IN) .............................. 202141035887
Jul. 21, 2022 (IN) .............................. 202141035887

(51) Int. Cl.
*H04W 28/08* (2023.01)
*H04W 48/06* (2009.01)
*H04W 72/56* (2023.01)
*H04W 74/0833* (2024.01)

(52) U.S. Cl.
CPC ....... *H04W 28/0846* (2020.05); *H04W 48/06* (2013.01); *H04W 72/56* (2023.01); *H04W 74/0833* (2013.01)

(58) Field of Classification Search
CPC .. H04W 28/0846; H04W 72/56; H04W 48/06
See application file for complete search history.

(56) References Cited

U.S. PATENT DOCUMENTS

2020/0359269 A1* 11/2020 Qiao .................. H04L 12/1407
2021/0204207 A1    7/2021 Fiorese et al.

FOREIGN PATENT DOCUMENTS

| EP | 3800916 A1 | 4/2021 |
| EP | 3846388 A1 | 7/2021 |
| WO | 2021119627 A1 | 6/2021 |
| WO | 2021125265 A1 | 6/2021 |

OTHER PUBLICATIONS

3GPP TR 23.700-40 V17.0.0 (Mar. 2021) Technical Report; 3rd Generation Partnership Project; Technical Specification Group Services and System Aspects; Study on enhancement of network slicing; Phase 2 (Release 17); 225 pages.
Intellectual Property India, "Examination Report under sections 12&13 of the Patents Act," dated Mar. 21, 2023, in connection with Indian Patent Application No. 202141035887, 7 pages.

(Continued)

*Primary Examiner* — Curtis B Odom

(57) ABSTRACT

The disclosure relates to a 5G or 6G communication system for supporting a higher data transmission rate. Embodiments herein disclose methods and systems of how an application function can request the Fifth Generation (5G) core network to perform a specific action, when a network slice quota reaches a maximum limit or when the behavior of the UE(s) falls outside the expected communication behavior.

9 Claims, 7 Drawing Sheets

(56) References Cited

OTHER PUBLICATIONS

International Search Report and Written Opinion of the International Searching Authority dated Nov. 10, 2022, in connection with International Application No. PCT/KR2022/011783, 8 pages.
3GPP TS 23.501 V17.1.1 (Jun. 2021) Technical Specification; 3rd Generation Partnership Project; Technical Specification Group Services and System Aspects; System architecture for the 5G System (5GS); Stage 2 (Release 17); 520 pages.

\* cited by examiner

METHODS AND SYSTEMS FOR AF CONTROL OF NETWORK SLICE QUOTA

CROSS REFERENCE TO RELATED APPLICATIONS

This application is based on and claims priority under 35 U.S.C. § 119 to Indian Provisional Patent Application No. 202141035887, filed Aug. 9, 2021, and Indian Non-Provisional Patent Application No. 202141035887, filed Jul. 21, 2022, the disclosures of which are incorporated by reference herein in their entirety.

BACKGROUND

1. Field

Embodiments disclosed herein relate to Network Slice Capability Exposure for Application Layer Enablement, and more particularly to methods and systems of how an application function (AF) can request a Fifth Generation (5G) core network to perform a specific action, when network slice quota reaches a maximum limit or when the behavior of the UE(s) fall outside the expected communication behavior.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IMT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 3rd Generation Partnership Project (3GPP) is currently enhancing the network slice capability of the 5G core network. Network slicing is a key feature of the 5G networks and enables building of dedicated logical networks on a shared infrastructure. These dedicated networks would permit the implementation of tailor-made functionality and network operations specific to the needs of each slice customer, rather than a one-size-fits-all approach as witnessed in the current and previous mobile generations, which may not be economically viable.

The GSM Association (GSMA) has provided Generic Network Slice Template (GST) to provide the standardized list of attributes that can characterize a type of network slice. The template provides list of attributes from which several Network Slice Types (NESTs) can be derived by assigning values to applicable attributes defined in the GST. Some of the attributes provide information about the scalability of the slice (for example, maximum number of UEs support per network slice, maximum number of PDU sessions supported per network slice) and are specific for the Network Slice Customer (NSC) and the Network Slice Provider (NSP).

3GPP TR 23.700-40 has provided methods to enforce such attributes in order to meet the quotas for the slice as specified in the NEST. According to the TR 23.700-40, a new network function (Network Slice Admission Control Function (NSACF)) is defined to manage network slice related quota. Further, a service provider (for example, AF) may subscribe with the NSACF via the network exposure function (NEF) for network slice quota event notifications for one or more attributes of the network slice; for example, max number of UEs per network slice, max number of PDU Sessions per network slice and max uplink (UL) or downlink (DL) data rate per network slice per UE. The network slice quota notification to the AF may be triggered when a threshold is reached or periodically.

During such network slicing enhancements, the 5G core network has added support to enable slice based quota, to enforce maximum number of UEs, maximum number of PDU sessions, etc. According to the enhancements, to enforce the network slice related quota on the maximum number of UEs, the 5GC controls the registration request on the single network slice selection assistance information (S-NSSAI) subject to the quota management by accepting or rejecting the request on the S-NSSAI. The access and mobility management function (AMF) checks whether local quota of the S-NSSAI is exceeded or not with the help of NSACF. If the quota is exceeded, the AMF adds the S-NSSAI in the Rejected NSSAI list and sends the rejected NSSAI list and a back off timer to UE. In case of rejection, the function may provide a rejection cause and optionally with a back-off timer.

The current mechanism for handing the network slice quota has an issue related to managing higher contract qualities subscriber for the service. It is possible for the third-party to offer its consumers different contract qualities level (for example, gold, silver and bronze). Upon reaching maximum UEs slice quota, the 5GC may reject the registration request on the S-NSSAI from the gold quality level customer which may not be desirable by the trusted third party. The third party application needs to provide a higher priority to the higher level of contract qualities (also referred to herein as higher priority UEs or subscriber categories) and so it needs to manage such connections. It is required to provide information about subscriber category to the 5GC and also, the action expected from the 5GC upon reaching the maximum number of UEs quota.

According to another requirement, an authorized third-party should be able to provide the 3GPP network expected communication behavior of UE(s), and also actions expected from the 3GPP network, when detecting behavior that falls outside the expected communication behavior.

There is no current method using which the 3rd party AF can communicate different information to 3GPP core network like subscriber category, communication behavior of UE(s), the action expected from the 3GPP core network upon reaching the network slice quota or the actions expected from the 3GPP core network when detecting behavior that falls outside the expected communication behavior.

The principal object of the embodiments herein is to disclose methods and system of how an application function can request the Fifth Generation (5G) core network to perform a specific action, when a network slice quota reaches a maximum limit or when the behavior of the UE(s) falls outside the expected communication behavior.

Another object of the embodiments herein is to disclose systems and methods for providing procedures between the application function (AF) and the network function (NF)/network exposure function (NEF), which enables managing slice for higher contract qualities subscriber for the service.

Another object of the embodiments herein is to disclose systems and methods for providing procedures for the AF to request an expected action upon reaching a threshold for the slice quota, to NEF.

Another object of the embodiments herein is to disclose systems and methods for providing procedures for the NEF to request an expected action upon reaching a threshold for the slice quota, to the NF.

Another object of the embodiments herein is to disclose systems and methods for providing a behavior for the NF to release the low priority users, upon reaching a threshold for the slice quota.

Another object of the embodiments herein is to disclose systems and methods for providing a new reject cause to release the user equipment (UE) for low priority users.

Another object of the embodiments herein is to disclose systems and methods for providing a new configured time slot during which for a given slice is not applied with network slice admission control related functionality.

Another object of the embodiments herein is to disclose systems and methods for providing a procedure for a vertical application layer (VAL) server which requests to manage network slice quota to network slice capability management (NSCM) server.

SUMMARY

Accordingly, the embodiments herein provide methods and system of how an application function can request the Fifth Generation (5G) core network to perform a specific action, when a network slice quota reaches a maximum limit or when the behavior of the UE(s) falls outside the expected communication behavior.

Accordingly, the embodiments herein provide a system and method for controlling a network slice quota. The method comprises sending, by an application function (AF), a request message including at least one action parameter to a network exposure function (NEF), on determining a network slice quota overflow or reaching a threshold or when a behavior of at least one user equipment (UE) falls outside an expected communication behavior. Subsequently, the method discloses forwarding, by the NEF, the request message including the at least one action parameter to a network function (NF) upon successful authorization of the AF. Thereafter, the method discloses performing, by the NF, at least one expected action according to the request message based on the at least one action parameter, on reaching the network slice quota or reaching the threshold or when the behavior of the at least one UE falls outside the expected communication behavior.

Accordingly, the embodiments herein provide a system and method for managing a network slice quota by a network slice capability management (NSCM) server. The method discloses sending, by a vertical application layer (VAL) server, a request message including the at least one action parameter towards the NSCM server for a network slice quota management. Subsequently, the method discloses authorizing, by the NSCM server, the VAL server. Thereafter, the method discloses subscribing, by the NSCM server, to at least one network slice quota event by sending a request to a 5G core network or a network exposure function (NEF). Later, the method discloses receiving, by the NSCM server, a notification of network slice quota threshold from the 5G core network or the NEF. Thereafter, the method discloses requesting, by the NSCM server, the 5G core network to perform at least one expected action, and wherein the NSCM server comprises the at least one expected action which is expected from the 5G core network on reaching the network slice quota threshold.

The expected action comprises releasing, by the NF or 5G core network, low priority users by identifying a list of UEs based on policies like least active UE, in case an action type of the at least one action parameter indicates to release the low priority users; releasing, by the NF or 5G core network, a list of users based on a list of UE IDs or a group ID of the at least one action parameter, in case the action type indicates to release the list of users; reducing, by the NF or 5G core network, a back off timer for a high priority user if a new registration request comes from the high priority user, in case the action type indicates to reduce the back off timer for the high priority user; and suspending, by the NF or 5G core network, a service for specific UEs based on the list of UE IDs or the group ID of the at least one action parameter, in case the action type indicates to suspend the service for specific UEs.

Accordingly, the embodiments herein provide a system and method for monitoring and controlling a slice admission-application function (slice admission AF), also referred to as NSACF in this embodiment. The method comprises receiving, from an access and mobility management function (AMF), a message request of an availability check and update procedure of a current number of user equipment (UE)s or by the SMF the protocol data unit (PDU) sessions per network slice. Subsequently, the method comprises increasing or decreasing, by the slice admission AF, the current number of UEs or PDU sessions registered per network slice based on the message request received from the AMF or SMF. The AMF/SMF is indicated only for illustration purpose it can be any 5GC network function (NF). Thereafter, the method discloses sending, by the slice admission AF, a message response that a maximum number of UEs or PDU sessions registered with the network slice have been reached.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
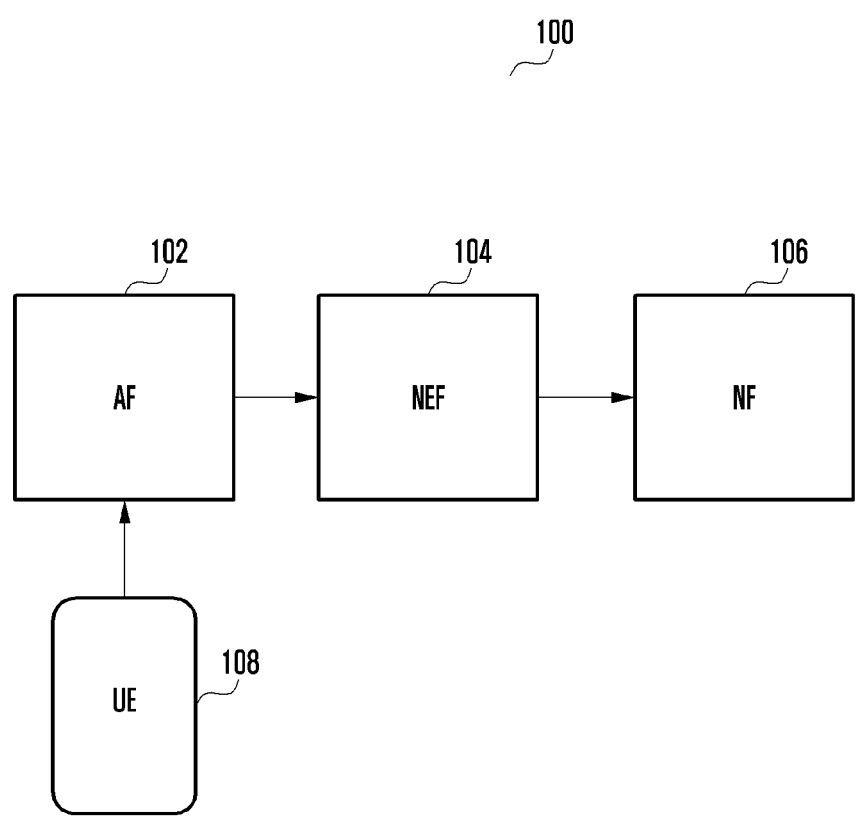
FIG. 1 illustrates a system for controlling a network slice quota, according to embodiments as disclosed herein.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems of how an application function can request the Fifth Generation (5G) core network to perform a specific action, when a network slice quota reaches a maximum limit or when a network slice quota reaches a threshold for a maximum limit (for example, if the maximum limit is 100 then the threshold can be 80, 90 or 95), or when the behavior of the UE(s) falls outside the expected communication behavior. Referring now to the drawings, and more particularly to FIGS. 1 through 4, where similar reference characters denote corresponding features consistently throughout the figures, there are shown at least one embodiment.

Embodiments herein reject the registration request upon reaching the maximum quota. It is possible for the third-party to offer its consumers different contract quality levels (for example, gold, silver, and bronze). Embodiments herein provide a higher priority to the higher level of contract qualities and so it needs to manage such connections. Embodiments herein provide methods for the 3$^{rd}$ party AF to communicate different information to the 3GPP core network like subscriber category, communication behavior of UE(s), the action expected from the 3GPP core network upon reaching the network slice quota or the action expected from the 3GPP core network upon reaching threshold for the network slice quota or the actions expected from the 3GPP core network when detecting behavior that falls outside the expected communication behavior.

FIG. 1 illustrates a system 100 for controlling a network slice quota. The system 100 comprises an application function (AF) 102, a network exposure function (NEF) 104, a network function (NF) 106, and at least one user equipment (UE) 108.

In an embodiment, the AF 102 is configured to send a request message including at least one action parameter to the NEF 104. The AF 102 sends the request message including the action parameter, on determining an overflow of the network slice quota or reaching a threshold of the network slice quota or when a behavior of at least one UE 108 falls outside an expected communication behavior.

In an embodiment, the NEF 104 is configured to forward the request message including the action parameter to the NF 106 upon a successful authorization of the AF 102.

In an embodiment, the NF 106 is configured to perform at least one expected action according to the request message based on the action parameter. The NF 106 performs the expected action, on reaching the network slice quota or reaching the threshold or when the behavior of the UE 108 falls outside the expected communication behavior.

Figure 2:
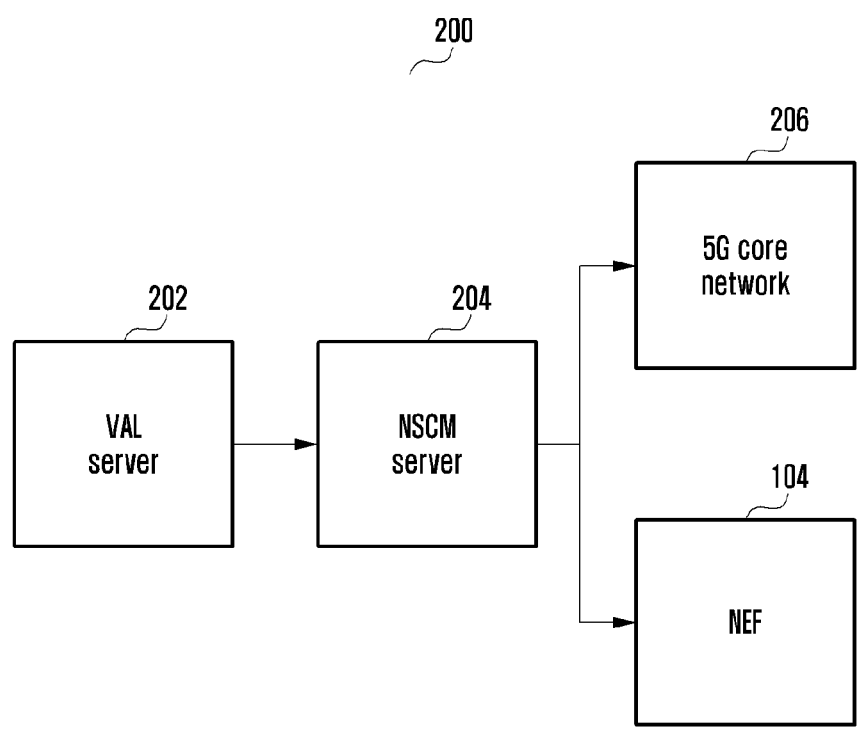
FIG. 2 illustrates a system for managing a network slice quota by a network slice capability management (NSCM) server, according to embodiments as disclosed herein.

FIG. 2 illustrates a system 200 for managing a network slice quota by a network slice capability management (NSCM) server 204. The system 200 comprises a vertical application layer (VAL) server 202, the NSCM server 204, a 5G core network 206, and the NEF 104.

In an embodiment, the VAL server 202 is configured to send the request message including at least one action parameter towards the NSCM server 204 for a network slice quota management.

In an embodiment, the NSCM server 204 is configured to authorize the VAL server 202. The NSCM server 204 is further configured to subscribe to the network slice quota event by sending a request to a 5G core network 206 or the NEF 104. The NSCM server 204 receives a notification of the network slice quota threshold from the 5G core network 206 or the NEF 104, and requests the 5G core network 206 to perform at least one expected action.

The expected action comprises:

releasing, by the NF 106 or the 5G core network 206, low priority users by identifying a list of UEs 108 based on policies like least active UE 108, in case an action type of the at least one action parameter indicates to release the low priority users;

releasing, by the NF 106 or the 5G core network 206, a list of users based on a list of UE IDs or a group ID (group ID can correspond to contract qualities level at AF) of at least one action parameter, in case the action type indicates to release the list of users;

reducing, by the NF 106 or the 5G core network 206, a back off timer for a high priority user if a new registration request comes from the high priority user, in case the action type indicates to reduce the back off timer for the high priority user; and suspending, by the NF 106 or 5G core network 206, a service for specific UEs based on the list of UE IDs or the group ID of at least one action parameter, in case the action type indicates to suspend the service for specific UEs.

Figure 3:
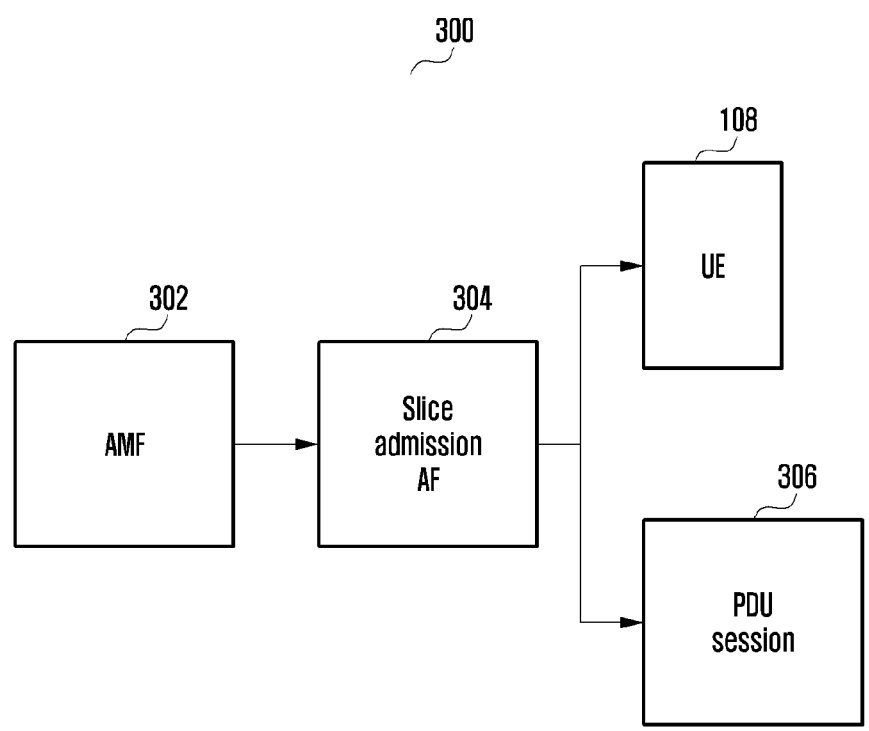
FIG. 3 illustrates a system for monitoring and controlling a slice admission-application function, according to embodiments as disclosed herein.

FIG. 3 illustrates a system 300 for monitoring and controlling a slice admission-application function 304 (slice admission AF). The system 300 comprises an access and mobility management function (AMF) 302 or session management function (SMF), the slice admission AF 304, at least one UE 108 and at least one protocol data unit (PDU) session 306.

In an embodiment, the AMF 302 is configured to send a message request to at least one slice admission AF 304 for an availability check and update procedure of a current number of user equipment (UE)s 108 and similarly the SMF is configured to send a message request to at least one slice admission AF 304 for an availability check and update procedure of a current number of PDU sessions 306 per network slice.

In an embodiment, the slice admission AF 304 is configured to increase or decrease the current number of UEs 108 or PDU sessions 306 which have been registered per network slice or to increase or decrease the quota for the current number of UEs 108 or PDU sessions 306 which have been registered per network slice. The UEs 108 or PDU sessions 306 can be increased or decreased or the quota for the UEs 108 or PDU sessions 306 can be increased or decreased based on the message request received from the AMF 302 or SMF. The slice admission AF 304 is further configured to send a message response when maximum number of UEs 108 or PDU sessions 306 has been reached.

In an embodiment, NSACF can act as the slice admission AF 304.

Figure 4:
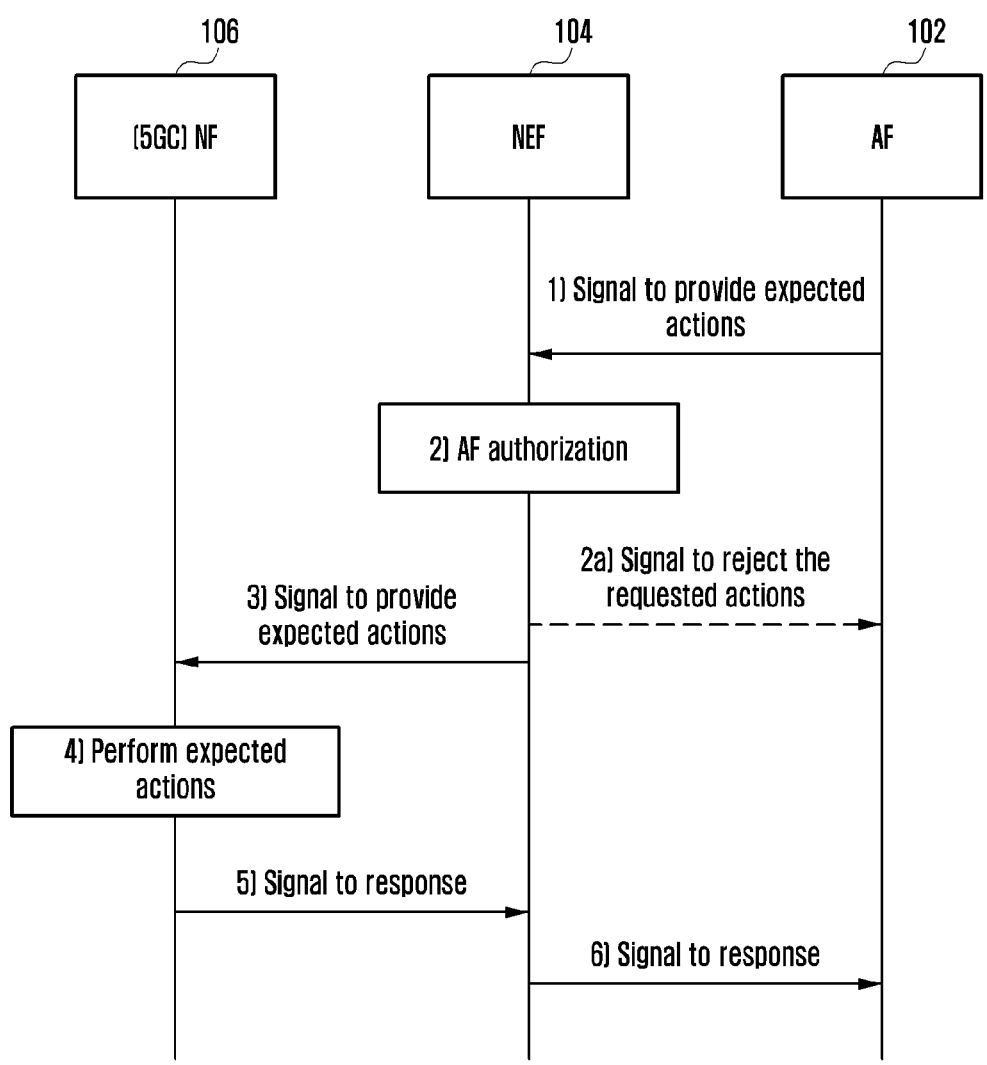
FIG. 4 illustrates a flow diagram of the process of the AF informing expected actions to be performed to 5GC NF, according to embodiments as disclosed herein.

FIG. 4 illustrates a flow diagram depicting the process of the AF 102 informing expected actions to be performed to 5GC NF 106.

Step 1: The AF 102 requests the possible actions (for example, when the AF 102 is requesting the service for first time or when the AF 102 receives the notification about the quota overflow or quota reaching a particular threshold or to update already set action parameters, etc.) by sending a signal message to the NEF 104. The AF 102 includes the following parameters:

network_slice_id—network slice identity (i.e., S-NS-SAIs) for which the AF 102 requires to perform specific action upon reaching quota overflow or a particular threshold or when the behavior of the UE(s) 108 falls outside the expected communication behavior;

quota_event_id—network slice quota attribute for which the action is required to be performed upon reaching overflow, for example, max number of UEs 108 per network slice quota; max number of PDU Sessions per network slice quota; max UL or DL data rate per network slice per UE quota.

action_type—one or more action attributes identifying the type of the action (i.e., release a low priority user where the AMF or any other NF 106 will select the low priority users, release a list of users as indicated by AF 102, reduce a back off timer for a high priority user, a time for service suspension for a specific list of UEs, etc.).

List_of_UE_ex_id—an optional parameter. If the action_type indicates to release the list of users as indicated by the AF or suspend service for specific UEs, the AF 102 may include the list of UE_ext_id as well (for example, Generic Public Subscription Identifier (GPSI) or Mobile Station Integrated Services Digital Network (MSISDN)), specifying one or more like group of UEs on which the expected action needs to be performed. This information can be conveyed as one or more of the user identities. If there is more than one user identity, the AF 102 can indicate the group ID.

group_id—an optional parameter. If the action_type indicates to release the list of users as indicated by the AF or to suspend service for specific UEs, the AF 102 may include the group_id as well, specifying the group of UEs on which the expected action needs to be performed.

action-id: an optional parameter. This parameter is used to update or cancel actions which were already informed previously. This parameter also includes indication of update or cancel action.

Communication patterns i.e., S-NSSAI and its applicability for example:

a) Time slot (for example between 21:00 to 24:00) during which a given slice like S-NSSAI is applicable or not applicable.

b) Geographical area where this S-NSSAI is applicable or not applicable;

i.e., the S-NSSAI is applied for network slice admission control only during those configured time slots or only in a configured geographical area. Other than configured communication patterns, a given Slice is not applied with network slice admission control related functionality.

Step 2: AF 102 authorization—The NEF 104 checks whether the AF 102 is authorized for sending actions to be performed on network slice quota overflow or when the behavior of the UE(s) 108 falls outside the expected communication behavior, using existing procedure. If the AF 102 authorization is successful, continue to step 3. If the AF 102 authorization fails, the NEF 104 returns a signal message in which the NEF 104 includes a reject cause reject_cause=authorization_fail and the procedure ends here.

Step 3: The NEF 104 forwards the request from the AF 102 to the NF 106 of 5GC. The NF 106 could be AMF, session management function (SMF), policy control function (PCF), NSACF or any other NF 106.

Step 4: The NF 106 validates the actions and stores them. The actions can be performed upon reaching slice quote overflow or when the behavior of the UE(s) 108 falls outside the expected communication behavior. The NF 106 can generate a unique action-id for the set of actions that facilitates in identification of the actions.

If the expected action in action_type parameter indicates to release low priority users as selected by 5GC, the NF 106 in 5GC may identify the list of UEs 108 based on policies (like least active UE) and may release the list of UEs 108. The low priority user can be identified in one or more mechanisms:

a) 5GC can store the group_id for each UE 108. The Group ID can be classified into one or more groups of UEs. A priority can be defined across the groups. The priority of each group can be provided by the AF 102 or can be stored internally (i.e., based on internal policy) in the NF 106 of the 5GC. The NF 106 can be, but not limited to, AMF or PCF or unified data repository (UDR) or unified data management (UDM) etc.

b) Each user's subscription information can indicate the priority based on which the 5GC can determine the low priority user(s). The priority of each subscriber can be provided by the AF 102 or can be stored internally in at least one of the NF 106 of the 5GC like AMF or PCF or UDR or UDM or NSACF etc., or can be exchanged between the NFs to get to know about the priority of each UE.

If the expected action in action_type parameter indicates to release the list of users as indicated by the AF 102, the NF 106 may release the list of UEs 108 specified in the list of UE IDs parameter or the list of UEs 108 which are part of the group specified in group_id parameter.

If the expected action in action_type parameter indicates to reduce the back off timer for high priority user(s) (on a new registration request coming from a high priority user), then the NF 106 may reject the request and may include a lower backoff timer for the high priority user compared to a low priority user. In general, the AF 102 can configure different back off timer values based on the priorities of the users in the 3GPP system. For example, for one of the group IDs or the group of particular users, the back-off timer can be 100 seconds and on another group, the back-off timer can be 20 seconds etc.

If the expected action in action_type parameter indicates to suspend service for specific UEs, the NF 106 may suspend the service for the list of UEs 108 specified in the list of UE IDs parameter or the list of UEs 108 which are part of the group specified in group id parameter.

Step 5: The NF 106 confirms and sends a success response signal message for the AF's request for actions on network slice quota overflow event notification to the NEF 104. The response message may also include a unique action-id for the successful result so that it can be used to cancel requests, update requests or even making multiple requests.

Step 6: The NEF 104 confirms and sends a success response signal message for the AF's request for actions on the network slice quota overflow event notification to the AF 102. The response message also includes a unique action-id for the successful result, so that it can be used to cancel requests, update requests or even making multiple requests.

In an embodiment herein, 'release low priority user' or 'suspend subscriber with other contract qualities' implies that the slice is released for low priority users. For example, by sending the respective slice ID like S-NSSAI as the rejected S-NSSAI to the UE 108 as part of the NAS (either 5GMM message or 5GSM) message like UE configuration update etc., by the AMF. Examples of the reject causes possible can be:

"S-NSSAI not available in the current PLMN or SNPN",
"S-NSSAI not available in the current registration area"
"S-NSSAI not available due to the failed or revoked network slice-specific authentication and authorization"
"S-NSSAI not available due to maximum number of UEs reached"
"insufficient resources for specific slice and DNN"
"insufficient resources for specific slice"

In an embodiment herein, 'release low priority user' implies that PDU session is released for the low priority user.

In an embodiment herein, the communication patterns are signaled from AF 102 to the 5GC NF 106; for example, NEF 104 or any other 5G NF. This information is propagated to the PCF or the UDM or the AMF or the NSACF or any other 5G NF 106. Embodiments herein have been explained from a perspective of the NSACF, but it may be obvious to a person of ordinary skill that embodiments herein are applicable when this information is stored in any other 5GC NF 106 like PCF, UDM, AMF, UDR, and so on. When the AMF sends the signal (for example, Nnsacf_NumberOfUEs-PerSliceAvailabilityCheckAndUpdate_Request) that the new UE 108 wants to be registered in 5GC for a slice (for example, S-NSSAI-A), the NSACF checks the configured communication pattern for that slice S-NSSAI-A, i.e., applicable time slot or applicable geographical area (for example, TAI list or Cell ID or any other mechanism of determining the geographical area). If that request is valid for a configured time slot (i.e., the request has arrived within the configured time slot for example between 21:00 to 24:00) or a configured geographical area (i.e., the UE 108 is in the configured geographical area), then the NSACF checks the quota; i.e., it checks if the new UE request does not exceed the quota and indicate the result parameter as
 a) maximum number of UEs per network slice has not been reached; i.e., slice is allowed, if quota does not exceed; or
 b) maximum number of UEs per network slice has reached; i.e., not allowed, if the number of UEs already registered with a slice exceed the maximum number of UEs per network slice quota does exist.

If based on communication patterns, the request is during the configured time slot or the UE 108 is in the configured geographical area, the NSACF will indicate a result parameter as allowed to the AMF; i.e., maximum number of UEs per network slice has not been reached.

Embodiments herein have been explained for "maximum number of UEs per network slice", but it may be obvious to a person of ordinary skill that embodiments herein are applicable for Number of PDU Sessions per network slice case or any other network slice related quota.

In an embodiment herein, if based on the communication pattern, the request is not during the configured time slot or the UE 108 is not in the configured geographical area, the NF 106 (i.e., the AMF, the SMF, or any other NF) will reject the request for registration of the S-NSSAI.

In an embodiment herein, the term 'quota available' means the number of UEs 108 registered on the slice or the number of PDU sessions which are registered to a slice (also called as S-NSSAI) are less than configured maximum respective value.

In an embodiment herein the term 'quota overflow' or 'quota exceeds' or 'quota threshold' means the number of UEs 108 registered on the slice or the number of PDU sessions which are registered/active to a slice have reached configured maximum respective value and therefore, allowing the new UE 108 to register for a slice or allowing establishment of new PDU session for the slice is not allowed.

In another embodiment herein, the AF 102 can include network_slice_id, quote event id, action_type, list of UE IDs or group ID parameters in the subscription request by calling Nnef_EventExpose_Subscribe Request or any other signal. The terms UE ID or group ID are used for illustration, however any other identifiers can be used for identifying the UE or the subscription of the UE, and the UE can be registered to the PLMN or to the SNPN.

In another embodiment herein, the AF 102 can include network_slice_id, quote event id, action_type, list of UE IDs or group ID parameters in the AF 102 request to the NF 106 (i.e., NSACF) to provision the quota of network slice or any other signal.

In another embodiment herein, the AF 102 initiates this procedure upon receiving the quota overflow notification or the network slice quota threshold notification or any other signal.

In another embodiment herein, the NF 106 (NEF or NSACF) informs the 5GC NF like AMF, SMF, UDM, PCF or any other 5GC NF about the actions expected from the 3GPP core network upon reaching network slice quota threshold in quota overflow notification response or the network slice quota threshold notification response or any other signal.

In another embodiment herein, upon receiving the Registration Request with requested S-NSSAI; for example, S-NSSAI-A, the AMF checks whether the local quota of the S-NSSAI is exceeded. If the local quota of the S-NSSAI has been exceeded, the AMF may request the local quota of the S-NSSAI to NSACF or any other 5G NF to request an increase in the quota. If the quota is increased, the AMF adds the S-NSSAI in the Allowed NSSAI. If the registration request is from a higher contract qualities subscriber, then based on the signal from the NSACF (or any other NF or other AF), the AMF may accept the new registration request, and may suspend subscribers with other lower contract qualities. Otherwise, the AMF sends the rejected S-NSSAI and a back off time to the UE 108 via the NAS message like registration accept or registration reject or UCU procedure.

Figure 5:
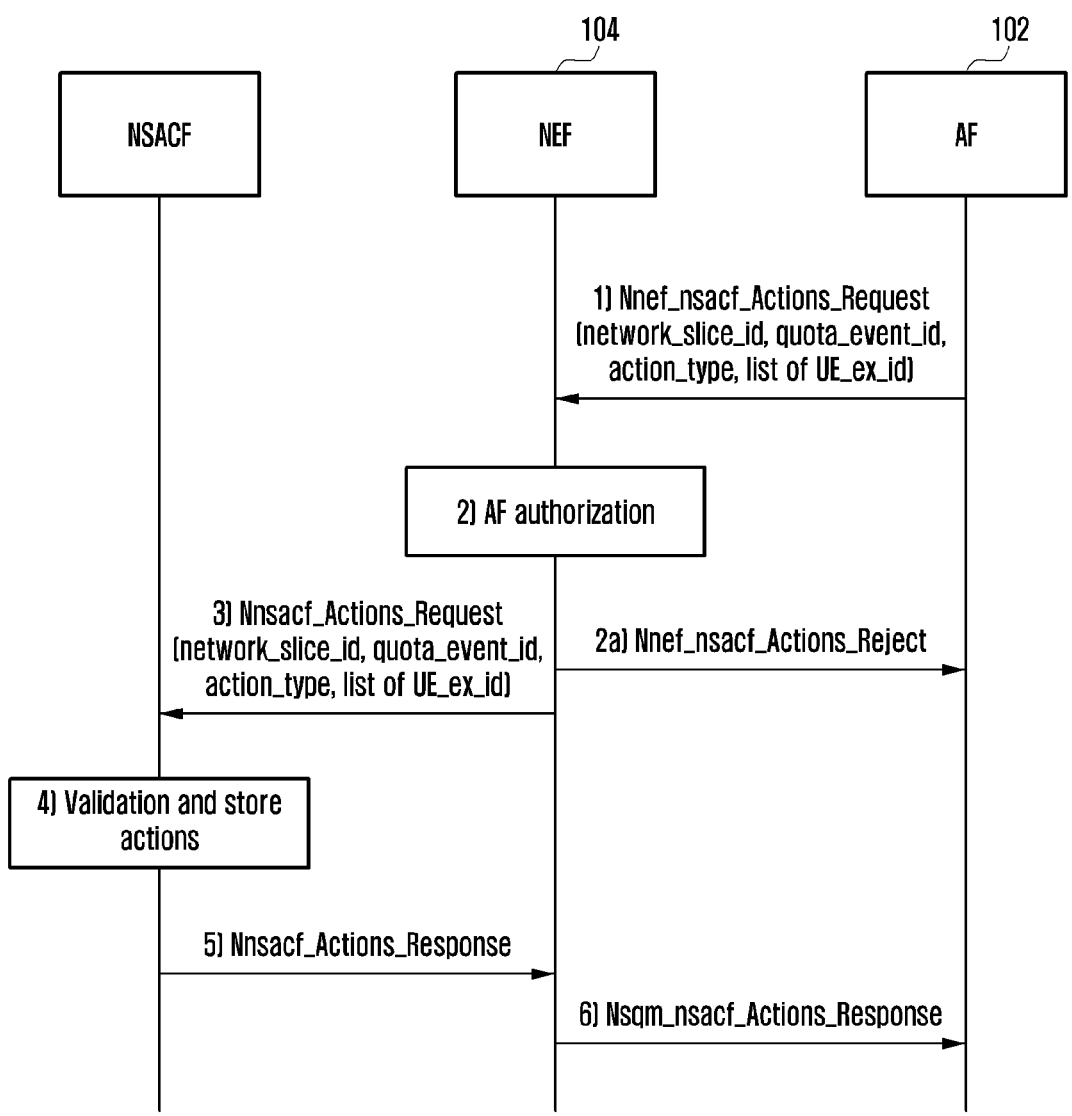
FIG. 5 illustrates a flow diagram of the process of the AF informing expected actions to be performed to NSACF, according to embodiments as disclosed herein.

FIG. 5 illustrates a flow diagram of the process of the AF 102 informing expected actions to be performed to the NSACF.

Step 1: The AF 102 requests the possible actions (for example, when the AF 102 is requesting the service for first time or when the AF 102 receives the notification about the quota overflow or quota reaching particular threshold or to update already set action parameters, etc.,) by sending Nnef_nsacf_Actions_Request message to the NEF 104. The AF 102 includes the following parameters:

- network_slice_id—network slice identity (i.e., S-NSSAIs) which the AF 102 requires to perform specific action upon reaching quota overflow or a particular threshold or when the behavior of the UE(s) 108 falls outside the expected communication behavior (for example not in expected time slot or not in expected geographical area);
- quota_event_id—network slice quota attribute for which the action is required to be perform upon reaching overflow, for example, the max number of UEs per network slice quota;
- the max number of PDU Sessions per network slice quota; the max UL or DL data rate per network slice per UE quota.
- action_type—one or more action attributes identifying the type of the action (i.e., release low priority user where the AMF or any other NF 106 will select the low priority users, release list of users as indicated by the AF 102, reduce back off timer for high priority user, time for service suspension for specific list of UEs, etc.).
- List_of_UE_ex_id—an optional parameter. If the action_type indicates to release list of users as indicated by the AF 102 or suspend service for specific UEs, the AF 102 may include the list of UE_ext_id as well (for example, GPSI or MSISDN) specifying one or more like group of UEs on which the expected action needs to be performed. This information can be conveyed as one or more of the user identities. If the user identity is more than one, the AF 102 can indicate the group ID.
- group_id—an optional parameter. If the action_type indicates to release list of users as indicated by AF or to suspend service for specific UEs, the AF 102 may include the group_id as well, specifying group of UEs on which the expected action needs to be performed.
- action-id: an optional parameter. This parameter is used to update or cancel actions, which were already informed previously. This parameter also includes an indication of update or cancels action.
- Communication patterns; i.e., S-NSSAI and its applicability; for example,
  a) Time slot (for example, between 21:00 to 24:00) during which a given slice like S-NSSAI is applicable or not applicable.
  b) Geographical area where this S-NSSAI is applicable or not applicable; i.e., the S-NSSAI is applied only during that time slots or only in a configured geographical area. Other than the configured communication patterns, a given slice is not applied with network slice admission control related functionality.

Step 2: AF 102 authorization—The NEF 104 checks whether the AF 102 is authorized for sending actions to be performed on network slice quota overflow or when behavior of UE(s) 108 falls outside the expected communication behavior. If AF 102 authorization is successful, continue to step 3.

a) If the AF 102 authorization fails, the NEF 104 returns Nnef_nsacf_Actions_Reject message in which the NEF 104 includes a reject_cause reject_cause=authorization_fail and the procedure ends here.

Step 3: The NEF 104 forwards the request from the AF 102 to the NSACF via Nnsacf_Actions_Request (network_slice_id, quota_event_id, action_type, list of UE_id).

Step 4: The NSACF validates the actions and stores them. The actions can be performed upon reaching slice quote overflow or when behavior of the UE(s) 108 falls outside the expected communication behavior. The NF 106 generates the unique action-id for the set of actions.

Step 5: Nnsq_Actions_Response—The NSACF confirms the AF's request for actions on network slice quota overflow event notification to the NEF 104. The response message also includes a unique action-id for the successful results, so that it can be used to cancel requests, update requests or even making multiple requests.

Step 6: Nnef_nsacf_Actions_Response—The NEF 104 confirms the AF's request for actions on a network slice quota overflow event notification to the AF 102. The response message also includes a unique action-id for a successful result, so that it can be used to cancel requests, update requests or even making multiple requests.

In an embodiment herein, the NSCM server 204 (i.e., the AF) can include action_type and the list of UE parameters in subscription request by calling Nnef_EventExpose_Subscribe_Request.

In another embodiment herein, the NSCM server 204 (i.e., AF) can include action_type and the list of UE parameters in the AF 102 request to the NSACF to provision the quota of network slice.

In another embodiment herein, the AF 102 initiates this procedure upon receiving the quota overflow notification or the network slice quota threshold notification.

In another embodiment herein, the NSACF informs the 5GC NF like AMF, SMF, PCF, UDM, UDR, NSACF optionally through NEF about the actions expected from the 3GPP core network upon reaching network slice quota threshold in the quota overflow notification response or the network slice quota threshold notification response.

In another embodiment herein, upon receiving the Registration Request to add the S-NSSAI into the Allowed NSSAI, the AMF checks whether the local quota of the S-NSSAI has been exceeded. If the quota has been exceeded, the AMF may request analytics from the NWDAF or any other network function (NF) 106 and request to increase the quota. If the quota has been increased, the AMF adds the S-NSSAI in the Allowed NSSAI. If the registration request is from a subscriber with higher contract qualities, then based on suggestions/signal/message from the NSACF or any other NF 106, the AMF may accept the new registration request, and may suspend/release/deregister the subscriber with lower contract qualities by sending the rejected S-NSSAI and a back off timer to the UE 108 via the NAS procedure like UCU procedure. Otherwise, the AMF sends the rejected S-NSSAI and a back off time to the UE 108 (subscriber with higher contract qualities) via the UCU procedure.

Reserved slices: The slice quota for each subscriber category can be signaled from the Application Function (AF) 102 to 5GC optionally through the NEF 104 and this is propagated to the network function (NF) 106 of 5GC to enforce the slice quota.

In another embodiment herein, the slice quota can be further divided among the subscriber categories and reserved to be used by a particular category of subscribers. For example, if the maximum number of UEs for a given slice is 100, then 30 can be reserved for GOLD subscribers and 70 can be reserved for low priority subscribers.
  a) When a count of 70 is reached, further requests from lower priority subscribers will be rejected;
  b) when a count of 30 is reached for GOLD subscribers and a 31st request is received from a GOLD category of subscriber and lower priority subscribers slice quota is underutilized, it can be allocated to the GOLD category subscribers.
  c) when a count of 30 is reached for GOLD subscribers and a 31st request is received from a GOLD category of subscriber and lower priority subscribers slice quota is also not available, then the low priority subscriber can be suspended to make a way for the GOLD priority subscriber.

Figure 6:
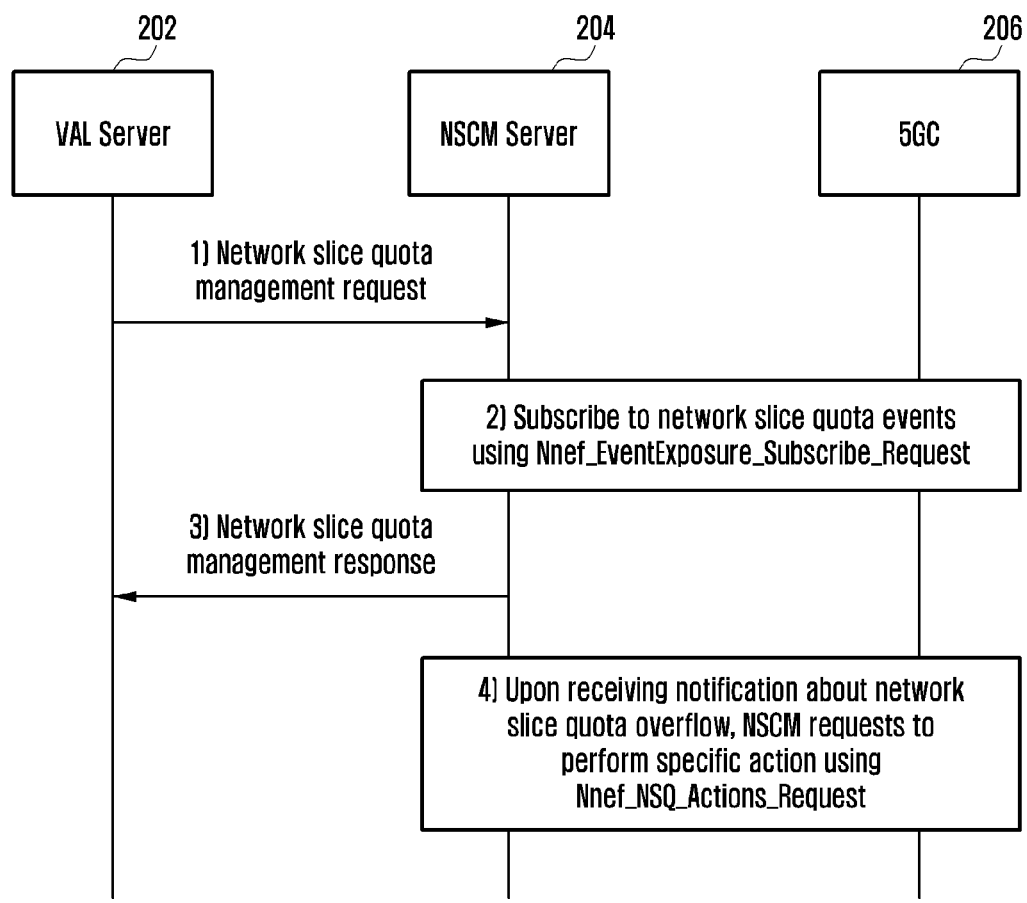
FIG. 6 illustrates a flow diagram of the process of the VAL server requesting to manage network slice quota to NSCM server, according to embodiments as disclosed herein.

FIG. 6 illustrates a flow diagram of the process of the VAL server 202 requesting to manage network slice quota to NSCM server 204. Embodiments herein enable the trusted third-party AF 102 to provide application policy information to the operator's service hosting environment. Embodiments herein also enable automatic management of application resources.

Step 1: The VAL server 202 initiates network slice quota management request towards the NSCM server 204. The request includes VAL service ID, slice identity, identity of the type of the quota, specific type of action to take (for example, release low priority users as identified by 5GC 206, release list of users as identified by the VAL server 202, etc.). In an embodiment herein, the request can optionally include a list of UEs 108 on which a specific action to be applied. Example information elements are depicted in Tables 1 and 2. The message also includes a unique identity for the request in order to update or cancel the action based on change of the requirement or the service provider's policy.

Table 1 describes the information flow network slice quota management request from the VAL server to the NSCM server.

TABLE 1

| Information element | Status | Description |
| --- | --- | --- |
| Action ID | O | Unique identity of the actions. This parameter is required to update or cancel the actions. |
| VAL service ID | M | The VAL service ID of the VAL application for which the network slice adaptation may corresponds to. |
| S-NSSAI | M | Slice identity |
| Quota details | | |
| >> Quota id | M | Network slice quota attribute. |
| >> action type | O | Identifies type of action. It can take one of the following values:<br>0x0001 - Release low priority users as selected by 5GC<br>0x0002 - Release list of users as indicated by AF<br>0x0004 - Reduce back off timer for high priority user<br>0x0008 - Suspend service for specific UEs<br>Or any other value |
| >> list of UE | O | Identifies list of UEs. This IE is set only if action type IE is set to release low priority users as selected by 5GC (0x0002) or release list of users as indicated by AF (0x0008). |

Table 2 describes the information flow network slice quota management response from the NSCM server 204 to the VAL server 202.

TABLE 2

| Information element | Status | Description |
| --- | --- | --- |
| Result | M | Result includes success or failure of the network slice adaptation with the underlying network. |
| Action Id | M | Unique action id associated with the list of expected action. |

Step 2: Upon receiving the request from the VAL server 202 to manage the network slice quota, the NSCM server 204 authorizes the VAL server 202. If the VAL server 202 is authorized, the NSCM server 204 subscribes to the network slice quota events. The NSCM server 204 includes one or more actions (for example, maximum number of UEs per slice is reached, etc.) expected from 3GPP core network upon reaching the network slice quota threshold.

Step 3: The NSCM server 204 sends the network slice quota management response specifying the result.

Step 4: Upon receiving notification from the 5GC/NEF about network slice quota threshold, the NSCM server 204 may request the 5GC 206 to perform one or more actions, if not specified already.

Figure 7:
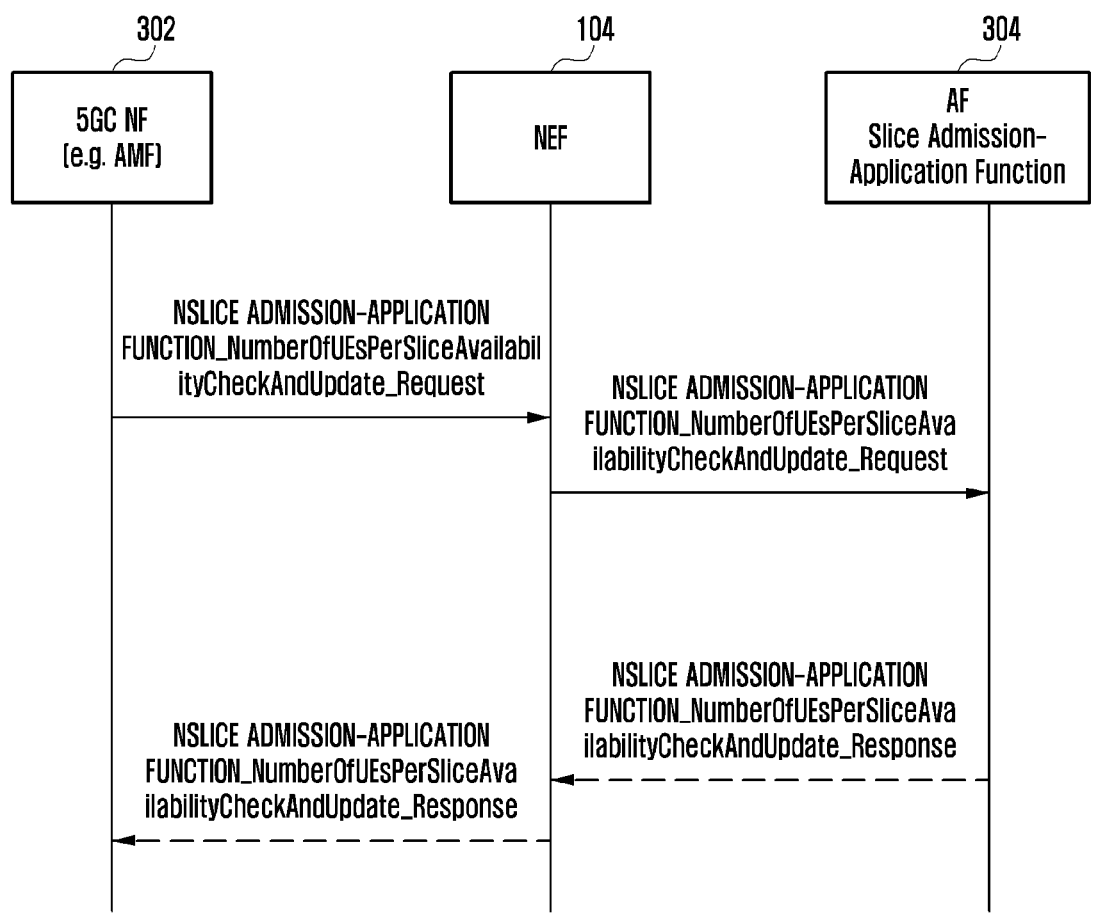
FIG. 7 illustrates a flow diagram of the process of monitoring and controlling the slice admission-application function, according to embodiments as disclosed herein.

FIG. 7 illustrates a flow diagram of the process of monitoring and controlling the slice admission-application function.

The slice admission-application function 304 monitors and controls the number of registered UEs per network slice and the number of PDU Sessions 306 per network slice for the network slices that are subject to Slice Admission Control (SAC). The slice admission-application function 304 can also be configured with the information indicating which access type is specified for the S-NSSAI subject to NSAC (i.e., 3GPP Access Type, Non-3GPP Access Type, or both).

The slice admission-application function 304 can be configured with the maximum number of UEs per network slice and the maximum number of PDU Sessions 306 per network slice which are allowed to be served by each network slice (S-NSSAI) that is subject to SAC.

Maximum number of UEs per network slice admission control:

The slice admission-application function 304 controls (i.e., increases, maintains, or decreases) the current number of UEs registered for a network slice, so that the maximum number of UEs allowed to register with that network slice is not exceeded. The slice admission-application function 304 also maintains a list of UE IDs registered with a network slice that is subject to NSAC. When the current number of UEs registered with a network slice is to be increased, the slice admission-application function 304 first checks whether the UE Identity is already in the list of UEs 108 registered with that network slice. If the UE Identity is not already in the list of UEs 108 registered with that network slice, the slice admission-application function 304 checks whether the maximum number of UEs per network slice for that network slice has already been reached.

A network function (NF) 106 of the core network (for example, the AMF 302) triggers a request to the slice admission-application function 304 for the maximum number of UEs per network slice admission control, when the UE's registration status for a network slice subject to NSAC may change. For example, during cases such as the UE Registration procedure in clause 4.2.2.2.2 of TS 23.502, the UE Deregistration procedure in clause 4.2.2.3 of TS 23.502, the Network Slice-Specific Authentication and Authorization procedure in clause 4.2.9.2 of TS 23.502, the AAA Server triggered Network Slice-Specific Re-authentication and Re-authorization procedure in clause 4.2.9.3 of TS 23.502, and the AAA Server triggered Slice-Specific Authorization Revocation in clause 4.2.9.4 of TS 23.502. The UE's registration status for a network slice during the above cases may change.

The UE 108 may register or deregister for an S-NSSAI via 3GPP access and/or non-3GPP access as described in clause 5.15.5.2.1. When the UE 108 is deregistered for an S-NSSAI, the access type may indicate 3GPP access or non-3GPP access or both. A NF 106 of the core network (for example, the AMF 302) provides the access type to the slice admission-application function 304 when triggering a request to the slice admission-application function 304. The slice admission-application function 304 takes access type into account for controlling the number of UEs 108 per network slice. The slice admission-application function 304 stores the UE ID with the associated access type.

For example, if the information configured in the slice admission-application function 304 includes 3GPP Access Type only, the slice admission-application function 304 counts registration via 3GPP Access Type only. If the information configured in the slice admission-application function 304 includes both access types, and the UE 108 newly registers via 3GPP access, while the UE 108 is already registered via non-3GPP access (or vice versa), the slice admission-application function 304 updates the UE ID with both 3GPP access type and non-3GPP access type.

If a network function (NF) 106 of the core network (for example, the AMF 302) is not aware of which slice admission-application function 304 to communicate, the network function (NF) 106 of the core network performs a slice admission-application function 304 discovery. A network function (NF) 106 of the core network (for example, the AMF 302) triggers the number of UEs 108 per network slice availability check and update the number of UEs 108 registered with a network slice, when a network slice subject to NSAC is included in the Allowed NSSAI (i.e., a NF 106 of the core network (for example, the AMF 302) requests to register the UE 108 with the S-NSSAI) or removed from the Allowed NSSAI for a UE 108. The trigger event at a NF 106 of the core network (for example, the AMF 302) also includes the change of Allowed NSSAI in case of inter-AMF mobility. The procedure is triggered in the following cases:

at UE Registration procedure, according to clause 4.2.2.2.2 (including Registration types of Initial Registration or Mobility Registration Update in inter-AMF mobility in CM-CONNECTED or CM-IDLE state):
before the Registration Accept in step 21 if the early availability check (EAC) mode is active; or
after the Registration Accept message if the EAC mode is not active;
at UE Deregistration procedure, as per clause 4.2.2.3, after the Deregistration procedure is completed;
at UE Configuration Update procedure (which may result from NSSAA procedure or subscribed S-NSSAI change):
before the UE Configuration Update message if the EAC mode is active; or
after the UE Configuration Update message if the EAC mode is not active;

Step 1: Depending on the deployment, there may be different slice admission-application functions 304 for different S-NSSAIs, subject to NSAC. Hence, during the registration, a NF 106 of the core network (for example, the AMF 302) triggers the number of UEs 108 per network slice availability check and updates the procedure to multiple slice admission-application functions.

Step 2: A NF 106 of the core network (for example, the AMF 302) sends NSLICE ADMISSION-APPLICATION FUNCTION_NumberOfUEsPerSliceAvailabilityCheck-AndUpdate_Request message or any other message to the slice admission-application function 304. A NF 106 of the core network (for example, the AMF 302) includes in the message the UE ID, access type, the S-NSSAI(s) and the update flag which indicates whether the number of UEs 108 registered with the S-NSSAI(s) is to be increased, when the UE 108 has gained registration to the network slice(s) subject to NSAC or the number of UEs 108 registered with the S-NSSAI(s) is to be decreased, when the UE 108 has deregistered from S-NSSAI(s) or could not renew its registration to an S-NSSAI subject to NSAC.

Step 3: The slice admission-application function 304 updates the current number of UEs registered for the S-NSSAI, i.e., increases or decrease the number of UEs 108 registered per network slice based on the information provided by a NF 106 of the core network (for example, the AMF 302) in the update flag parameter.

If the update flag parameter from a NF 106 of the core network (for example, the AMF 302) indicates an increase in the number of UEs 108, the following applies:

If the UE ID is already in the list of UEs 108 registered with the network slice, the current number of UEs is not increased as the UE 108 has already been counted as registered with the network slice. The slice admission-application function 304 creates a new entry associated with this new update and may also temporarily maintain the old entry associated with the previous update. The slice admission-application function 304 removes the old entry upon reception of a request with the update flag indicating a decrease in the number of UEs 108.

Consider a scenario, where there are two entries temporarily in the slice admission-application function 304 for the same UE 108 during inter-AMF mobility, when there is no UE 108 context transfer and the UE 108 requests to register with S-NSSAI(s) subject to NSAC already used in the old AMF 302. The old entry in the slice admission-application function 304 is removed by the old AMF 302.

If the UE ID is not in the list of UE IDs registered with the network slice and the maximum number of UEs registered with the network slice has not been reached, the slice admission-application function 304 adds the UE ID in the list of UEs 108 registered with the network slice and increases the current number of the UEs registered with the network slice. If the UE ID is not in the list of UEs 108 registered with that S-NSSAI and the maximum number of UEs for that S-NSSAI has already been reached, then the slice admission-application function 304 returns a result parameter indicating that the maximum number of UEs registered with the network slice has been reached.

If the update flag parameter from a NF 106 of the core network (for example, the AMF 302) indicates decrease and if there is only one entry associated with the UE ID, the slice admission-application function 304 removes the UE ID from the list of UEs 108 registered with the network slice for each of the S-NSSAI(s) indicated in the request from a NF 106 of the core network (for example, the AMF 302) and also the slice admission-application function 304 decreases the number of UEs 108 per network slice that is maintained by the slice admission-application function 304 for each of these network slices. If there are two entries associated with the UE ID, the slice admission-application function 304 removes the old entry and keeps the new entry.

The slice admission-application function 304 takes access type into account for controlling the number of UEs 108 per network slice.

Step 4: The slice admission-application function 304 returns the NSLICE ADMISSION-APPLICATION FUNCTION_NumberOfUEsPerSliceAvailabilityCheckAndUpdate_Response or any other response message in which the slice admission-application function 304 includes the S-NSSAI(s) for which the maximum number of UEs per network slice has already been reached along with a result parameter indicating that the maximum number of UEs registered with the network slice has been reached.

At the UE Registration procedure, if only some of the S-NSSAIs reached the maximum number of UEs per S-NSSAI, a NF 106 of the core network (for example, the AMF 302) sends a Registration Accept message to the UE 108 in which a NF 106 of the core network (for example, the AMF 302) includes the rejected S-NSSAI(s) in the rejected NSSAI list for which the slice admission-application function 304 has indicated that the maximum number of UEs per network slice has been reached, and for each rejected S-NSSAI, a NF 106 of the core network (for example, the AMF 302) includes a reject_cause set to 'maximum number of UEs per network slice reached' and optionally a back-off timer.

When for all the requested S-NSSAI(s) provided in step 2, the slice admission-application function 304 returned the maximum number of UEs per network slice has been reached and if one or more subscribed S-NSSAIs are marked as default in the subscription data and not subject to Network Slice Admission Control, a NF 106 of the core network (for example, the AMF 302) can decide to include these Default Subscribed S-NSSAIs in the Allowed NSSAI. Otherwise, a NF 106 of the core network (for example, the AMF 302) rejects the UE request for registration. In the Registration Reject message, the AMF 302 includes the rejected S-NSSAI(s) in the rejected NSSAI parameter, and for each rejected S-NSSAI the AMF 302 includes a reject cause to indicate that the maximum number of UEs per network slice has been reached and optionally a back-off timer.

If the use case requires the UE 108 to remain reachable at all times with at least one slice, it is recommended that at least one of the Subscribed S-NSSAIs is marked as the default S-NSSAI which is not subject to Network Slice Admission Control. This will ensure the UE 108 is able to access to services even when maximum number of UEs per network slice has been reached.

In an embodiment herein, the slice admission-application function 304 can be in the trusted domain of the operator. In an embodiment herein, the slice admission-application function 304 may not be in the trusted domain of the operator (i.e., core network like 5GC 206). The slice admission-application function 304 (as it is outside the operator network) is capable of monitoring the number of UEs 108 registered to a slice across the different PLMN IDs i.e., across different operators. Each operator (when a UE 108 is registering with the network) will request for admission control as disclosed herein and the slice admission-application function 304 can determine if threshold is reached across the operators and indicate to the requesting 5GC 206 (operator), whether the UE 108 can be admitted or not admitted.

A NF 106 of the core network (for example, the AMF 302) sends NSLICE ADMISSION-APPLICATION FUNCTION_ NumberOfUEsPerSliceAvailabilityCheckAndUpdate_Request message to the slice admission-application function 304, if the slice admission-application function 304 is in the trusted domain. If the slice admission-application function 304 is not in the trusted domain, the NF 106 of core network will send the requests to the NEF 104, which will propagate to the slice admission-application function 304. In this case, the NEF 104 will act as an anchor between the 5GC 206 and the slice admission-application function 304.

Maximum number of PDU sessions 306 per network slice admission control:

The slice admission-application function 304 controls (i.e., increases, maintains, or decreases) the current number of PDU Sessions 306 per network slice, so that the maximum number of PDU session 306 allowed to be served by that network slice is not exceeded. When the current number of PDU sessions 306 with the network slice is to be increased, the slice admission-application function 304 first checks whether the maximum number of PDU sessions 306 per network slice for that network slice has already been reached.

A NF 106 of the core network (for example, the SMF) triggers a request to the slice admission-application function 304 for the maximum number of PDU sessions per network slice control during the PDU session 306 establishment/release procedure.

Embodiments herein have been explained from a perspective of the "maximum number of UEs registered with the network slice has been reached", but it may be obvious to a person of ordinary skill that the same principles of admission control are applicable for "Maximum number of PDU sessions per network slice admission control" when the PDU session 306 is established or released.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for controlling a network slice quota, the method comprising:
   sending, by an application function (AF), a request message including at least one action parameter to a network exposure function (NEF) on determining a network slice quota overflow or reaching a threshold or in case that a behavior of at least one user equipment (UE) falls outside an expected communication behavior;
   forwarding, by the NEF, the request message including the least one action parameter to a network function (NF) upon successful authorization of the AF;
   performing, by the NF, at least one expected action according to the request message based on the at least one action parameter, on reaching the network slice quota or reaching the threshold or in case that the behavior of the at least one UE falls outside the expected communication behavior,
   wherein the at least one expected action comprises:
      releasing, by the NF, low priority users by identifying a list of UEs based on policies, in case that an action type of the at least one action parameter indicates to release the low priority users;
      releasing, by the NF, a list of users based on a list of UE IDs or a group ID of the at least one action parameter, in case that the action type indicates to release the list of users;
      reducing, by the NF, a back off timer for a high priority user in case that a new registration request comes from the high priority user, in case that the action type indicates to reduce the back off timer for the high priority user; and
      suspending, by the NF, a service for specific UEs based on the list of UE IDs or the group ID of the at least one action parameter, in case that the action type indicates to suspend the service for specific UEs.

2. The method of claim 1, wherein the at least one action parameter comprises at least one of a network slice id, a quote event id, the action type, the list of UE IDs, the group ID, a network slice id, a quota event id or an action id.

3. The method of claim 1, further comprising:
   rejecting, by the NEF, the request message including the at least one action parameter, in case that the authorization of the AF fails.

4. The method of claim 1, further comprising validating and storing, by the NF, the at least one action parameter.

5. The method of claim 1, further comprising:
   sending, by the NF, a success response message along with a unique action-id to the NEF in response to the AF request message, wherein the unique action-id is generated by the NF for at least one expected action; and
   sending, by the NEF, a success response message along with the unique action-id to the AF in response to the AF request message upon receiving the success response message from the NF.

6. The method of claim 1,
   wherein the NF comprises at least one of an access and mobility management function (AMF), a session management function (SMF), a policy control function (PCF) or a network slice access control function (NSACF) of a 5G core network, and
   wherein the AF comprises at least one of a network slice capability management (NSCM) server or a VAL server.

7. The method of claim 1, further comprising:
   determining, by the NF, whether the request message for a network slice is valid for a configured time slot or a configured geographical area, indicating, by the NF, a result parameter as allowed in case that the request message for that network slice is during the configured time slot and during the configured geographical area, and indicating, by the NF, a result parameter as rejected in case that the request message for that network slice is not during the configured time slot and not during the configured geographical area.

8. The method of claim 1,
wherein the network slice quota for each subscriber category is signaled from the AF to NF to enforce the network slice quota, and
wherein the network slice quota is divided among the subscriber categories and reserved to be used by a particular category of subscriber.

9. A system for controlling a network slice quota, the system comprising:
an application function (AF) configured to send a request message including at least one action parameter to a network exposure function (NEF), on determining a network slice quota overflow or reaching a threshold or in case that a behavior of at least one user equipment (UE) falls outside an expected communication behavior;
the NEF configured to forward the request message including the at least one action parameter to a network function (NF) upon successful authorization of the AF;
the NF configured to perform at least one expected action according to the request message based on the at least one action parameter, on reaching the network slice quota or reaching the threshold or in case that the behavior of the at least one UE falls outside the expected communication behavior,
wherein to perform the at least one expected action, the NF is configured to:
release low priority users by identifying a list of UEs based on policies like least active UE, in case that an action type of the at least one action parameter indicates to release the low priority users;
release a list of users based on a list of UE IDs or a group ID of the at least one action parameter, in case that the action type indicates to release the list of users;
reduce a back off timer for a high priority user in case that a new registration request comes from the high priority user, in case that the action type indicates to reduce the back off timer for the high priority user; and
suspend a service for specific UEs based on the list of UE IDs or the group ID of the at least one action parameter, in case that the action type indicates to suspend the service for specific UEs.

* * * * *